UNITED STATES PATENT OFFICE.

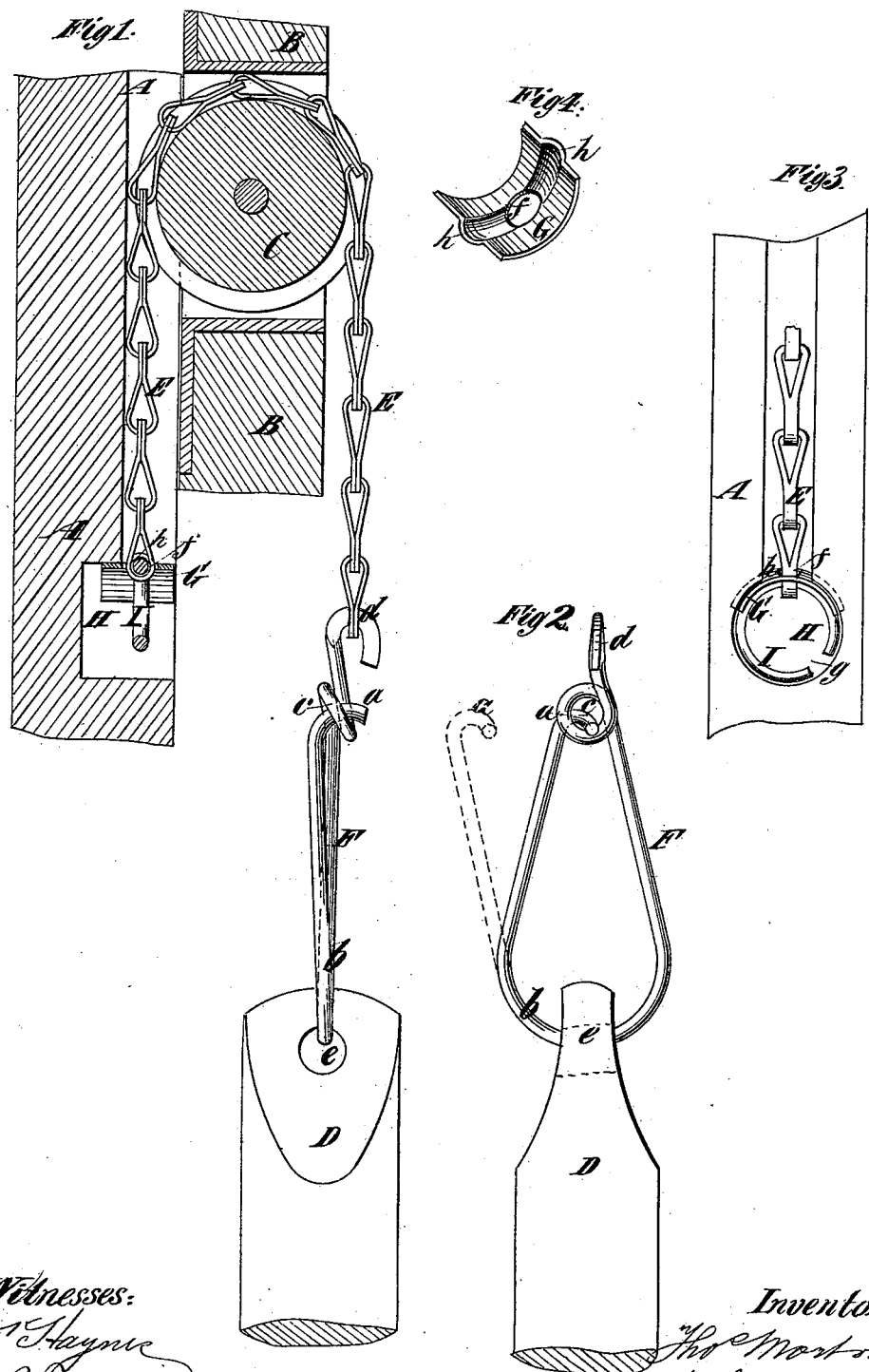

THOMAS MORTON, OF NEW WINDSOR, NEW YORK.

SASH-CORD FASTENER.

SPECIFICATION forming part of Letters Patent No. 236,351, dated January 4, 1881.

Application filed February 11, 1880.

*To all whom it may concern:*

Be it known that I, THOMAS MORTON, of New Windsor, in the county of Orange and State of New York, have invented certain new and useful Improvements in Devices for Suspending Sash-Weights, of which the following is a specification.

My improvements, while more especially relating to sash-balance fixtures or attachments in which chains are used to connect the sashes and weights, are applicable to fixtures in which cords or other means of connection are employed; and their objects are to facilitate the connection of the weight to the chain or its equivalent, to give strength and security to the connection between these parts, and to provide a simple and easily-applied device or fixture for securing the chain or its equivalent to the sash.
My improvements consist in an improved hook or device for connecting the weight and the chain or its equivalent, and in an improved device for connecting the chain or its equivalent with the sash, so that it may be readily detached therefrom, if desirable, and which prevents the chain from turning or twisting; also, in the novel combination of certain of these devices.

In the accompanying drawings, Figure 1 represents a vertical section of portions of a window sash and frame having all my improvements applied thereto. Fig. 2 represents a detached view of my improved hook or device for connecting the chain or its equivalent and the weight. Fig. 3 represents an edge view of a portion of the sash, illustrating the manner of connecting the end of the chain thereto. Fig. 4 represents a perspective view of one of the devices used in connecting said sash and chain.

A designates a portion of a window-sash, B designates a portion of a frame, C designates a flanged or grooved pulley, and D designates a sash-weight, all of which are of ordinary or other construction.

The connection between the sash A and weight D is represented as consisting of a sash-chain, E, made of sheet metal; but a cord of wire, of hemp, a metal band, or other flexible connection, might be substituted therefor.

F designates a hook or device for connecting the weight D and chain E. The hook or device F is made of a single piece of steel or other wire, having a hook, *a*, at one end, which, when the wire is bent to form the link or loop *b*, is adapted to engage with an eye, *c*, formed by bending the wire near its other end. Beyond or above the eye *c* the other end of the wire is bent so as to form a hook, *d*, to which the sash-chain E may be readily connected, as shown in Fig. 1.

In forming the hook *d* the fibers of metal are disturbed, and to condense the fibers, as well as to give the hook the greatest thickness in the direction of the strain, I flatten the two sides of the said hook, as shown especially in Fig. 2.

When it is desired to attach a weight the hook *a* is detached from the eye *c*, and the loop or link *b* sprung out, as represented in dotted outline in Fig. 2, sufficiently to pass through the eye *e* of the weight, after which the hook *a* is hooked into the eye *c*.

This novel form of hook or device enables a weight to be very easily and quickly connected and is very strong and durable.

Referring now to the devices for connecting the chain to the sash, G designates a plate or piece of metal adapted to fit in a recess, H, (shown as circular in form,) in the edge of the sash A, and having a hole, *f*, through which the end of the chain E is passed.

I designates a device or key, here represented as consisting of a ring having an opening, *g*, at one side to permit it to be slipped through the link of the chain E. The chain being first inserted through the hole *f* in the plate G, the ring I is inserted through the link of the chain, thereby securing the plate G to the chain. The plate G, being then inserted in the recess H, is held against upward movement, and the chain thereby securely connected to the sash. Though the key or device I is represented as consisting of a ring, it might consist of a segment or a straight bar, being made to fit the plate or piece G.

It is necessary, when chains of the form represented are employed, to prevent the chains from turning or twisting, and the keys I must be kept from turning upon the plates G, the latter being held immovable by the recesses H, in which they fit. As here represented, the plate G is grooved or corrugated at *h*, as shown clearly in Fig. 4, so as to form a key-seat for the key I, and thereby effectually prevent it from turning.

This method of connecting sash-chains to sashes is very desirable, as it dispenses with screws or other devices often employed for securing the fastening devices to the sash, and provides for the easy and quick connection of the sash-chains.

I am aware that an open link having two hooked ends has been used for attaching a weight to a sash-chain, the hooks engaging separate links of the chain, and that a forked bracket engaging a ring or key secured to the lower link of the sash-chain has been arranged in a recess in a sash; and I do not claim either of these devices, broadly, nor the combination thereof with the chain.

What I claim as my invention, and desire to secure by Letters Patent, is—

1. The suspending device F, composed of a single piece of wire having hooks $a\ d$, a loop, $b$, and eye $c$, substantially as herein described.

2. The combination, with the chain E and weight D, of the suspending device F, constructed or provided with hooks $a\ d$, loop $b$, and eye $c$, substantially as herein described.

3. The combination, with the chain E and sash A, of the corrugated curved plate or key-seat G, fitting within the circular recess H in the sash, and provided with a hole, $f$, through which the chain is passed, and the ring-shaped key I, inserted in the chain-link and fitting in the corrugation of said plate, substantially as specified.

THOMAS MORTON.

Witnesses:
CHANDLER HALL,
FREDK. HAYNES.